United States Patent [19]

Sato

[11] Patent Number: 5,754,435
[45] Date of Patent: May 19, 1998

[54] METHOD AND APPARATUS FOR CALCULATING POWER CONSUMPTION OF INTEGRATED CIRCUIT

[75] Inventor: Toshinori Sato, Ichikawa, Japan

[73] Assignee: Kabushiki Kaisha Toshiba, Kawasaki, Japan

[21] Appl. No.: 447,714

[22] Filed: May 23, 1995

[30] Foreign Application Priority Data

May 24, 1994 [JP] Japan ............................ 6-109862
May 17, 1995 [JP] Japan ............................ 7-118712

[51] Int. Cl.$^6$ ............................ G01R 21/10; G06F 17/50
[52] U.S. Cl. ............................ 364/480; 364/481; 364/483; 364/488; 364/489; 364/578
[58] Field of Search ............................ 364/480, 481, 364/483, 488, 489, 578

[56] References Cited

U.S. PATENT DOCUMENTS

| | | | |
|---|---|---|---|
| 5,473,548 | 12/1995 | Omori et al. | 364/489 |
| 5,532,935 | 7/1996 | Ninomiya et al. | 364/492 |
| 5,537,328 | 7/1996 | Ito | 364/489 |
| 5,555,201 | 9/1996 | Dangelo et al. | 364/489 |
| 5,557,557 | 9/1996 | Frantz et al. | 364/578 |
| 5,602,753 | 2/1997 | Fukui | 364/489 |
| 5,625,803 | 4/1997 | McNelly et al. | 395/500 |

FOREIGN PATENT DOCUMENTS 5-165912 7/1993 Japan.
5-265605 10/1993 Japan.

*Primary Examiner*—Edward R. Cosimano
*Attorney, Agent, or Firm*—Foley & Lardner

[57] ABSTRACT

A method of calculating power consumption of an integrated circuit having a plurality of function blocks, comprises the steps of: detecting the function blocks required for a predetermined operation, in sequence; obtaining each power consumption in operation of each of the detected function blocks; and summing up each power consumption obtained for each function block, to output the summed-up power consumption as a power consumption of the whole integrated circuit. Here, the power consumption is obtained by deferring to a table in which power consumption is previously registered for each function block. Further, the power consumption can be calculated by use of an approximate expression represented by a predetermined function f and a predetermined constant power consumption as follows: $P = f(PA, HA, WA, PC, HC, WC) + \text{constant}$, where A denotes a vector of all signals inputted to each of the detected function blocks; C denotes a vector of all signals outputted from each of the detected function blocks; PA denotes a maximum power consumption caused by the vector A; HA denotes a number of bits each of whose logical values changes in time transition from a preceding time to a current time in the vector A; WA denotes a bit width of the vector A; PC denotes a maximum power consumption caused by the vector C; HC denotes a number of bits each of whose logical values changes in time transition from a preceding time to a current time in the vector C; and WC denotes a bit width of the vector C.

50 Claims, 4 Drawing Sheets

METHOD AND APPARATUS FOR CALCULATING POWER CONSUMPTION OF INTEGRATED CIRCUIT

BACKGROUND OF THE INVENTION

The present invention relates to a method and apparatus for calculating a power consumption of an integrated circuit.

In general, an integrated circuit is designed beginning from an upper specification design process to a lower layout design process in sequence, for example, in the order of specification design process, architecture design process, function design process, logic design process, circuit design process, and layout design process. In this case, in the architecture design process, a data flow through each of the function blocks 21 to 31, for instance as shown in FIG. 3, is designed. In the logic design process, a logic circuit using two NAND gates 41 and 42, for instance as shown in FIG. 4, is designed. In the transistor circuit design, a transistor circuit composed of transistors 51 to 54, for instance as shown in FIG. 5, is designed.

On the other hand, a power consumption P(W) can be calculated by use of an expression as P=I×E, where I (A) denotes the current, and E (V) denotes the operating voltage. In the conventional method, a circuit, for example, such as the logic circuit as shown in FIG. 4 or the transistor circuit as shown in FIG. 5 is simulated to calculate the current and voltage, that is, a power consumption P. In the case of the transistor circuit shown in FIG. 5, the current I flowing from a supply voltage terminal $V_{DD}$ to a ground voltage terminal $V_{SS}$ is obtained by the circuit simulation by a computer, and the power consumption P can be obtained on the basis of the obtained supply voltage $V_{DD}$ and the current I.

In the above-mentioned power consumption calculation, the upper design process exerts a great influence upon the final power consumption. For instance, a change in design of the architecture design process exerts a serious influence upon the final power consumption. Accordingly, it is extremely effective to estimate the power consumption in the architecture design process, whenever the power consumption of an integrated circuit is required to be minimized.

In the conventional calculation method, however, since the power consumption of an integrated circuit has been so far calculated by use of a logic circuit or a transistor circuit, the power consumption can be estimated only after the design process proceeds to such a low design process as the logic circuit design or the transistor design process. As a result, in the conventional method, the power consumption has been optimized only in the logic design process or the circuit design process, by giving up the optimization of the power consumption in the architecture design process. In this case, since the integrated circuit is optimized only in the lower design process, the power consumption can not be reduced effectively; in other words, the conventional calculation method is not effective.

Further, there exists such a conventional method that the power consumption is calculated in the logic circuit design process or the transistor circuit design process; the calculated power consumption is fed back to the architecture design process to design the architecture again; and the logic circuit and the transistor circuit are designed again on the basis of the re-designed architecture. In this method, however, there exists a problem in that the number of design steps and the time required for the design increase, resulting in an increase in design cost of the integrated circuit.

SUMMARY OF THE INVENTION

With these problems in mind, therefore, it is the object of the present invention to provide a method and apparatus for calculating the power consumption of an integrated circuit, under optimum conditions and at a low cost.

To achieve the above-mentioned object, the present invention provides a method of calculating power consumption of an integrated circuit having a plurality of function blocks, comprising the steps of: detecting the function blocks required for a predetermined operation, in sequence; obtaining each power consumption in operation of each of the detected function blocks; and summing up each power consumption obtained for each function block, to output the summed-up power consumption as a power consumption of the whole integrated circuit.

Here, in the step of obtaining each power consumption, the power consumption is obtained by referring to a table in which power consumption is previously registered for each function block.

Further, in the step of obtaining each power consumption, when-n-units of vectors Ai are inputted to a detected function block, the power consumption P is calculated by use of an approximate expression as $P=f(A_1, A_2, \ldots, A_n)$+constant, where n denotes an integer of one or more; and i denotes an integer from one to n; or as $P=f(A_i, \ldots)$+constant; or as $P=f(PA_1, PA_2, \ldots, PA_n, HA_1, HA_2, \ldots, HA_n, WA_1, WA_2, \ldots, WA_n)$+constant, where $PA_i$ denotes each maximum power consumption caused by each vector $A_i$; $HA_i$ denotes each number of bits each having a predetermined logical value in each vector $A_i$; $WA_i$ denotes a bit width of each vector $A_i$, and where "constant" denotes a predetermined constant power consumption; or as $P=f=PA_1 \text{ xHA}_1 /WA_1+PA_2 \text{ xHA}_2 /WA_2+\ldots+PA_n \text{ xHA}_n /WA_n$+constant; or as $P=f(PA_i, HA_i, WA_i)$+constant; or as $P=f=PA_i \text{ xHA}_i /WA_i+\ldots$+constant.

Further, in the step of obtaining each power consumption, when n-units of vectors $A_i$ are inputted to each detected function block and m-units of vectors $C_j$ are outputted from each detected function block, the power consumption P is calculated by use of an approximate expression as $P=f(A_1, A_2, \ldots, A_n, C_1, C_2, \ldots, C_m)$+constant, where n and m denote integers of one or more, respectively; and i and j denote an integer from one to n and m, respectively; or as $P=f(A_i, \ldots, C_j, \ldots)$+constant; or $P=f(PA_1, PA_2, \ldots, PA_n, HA_1, HA_2, \ldots, HA_n, WA_1, WA_2, \ldots, WA_n; PC_1, PC_2, \ldots, PC_m, HC_1, HC_2, \ldots, HC_m, WC_1, WC_2, \ldots, WC_m)$+constant, where $PA_i$ denotes each maximum power consumption caused by each vector $A_i$; $HA_i$ denotes each number of bits each having a predetermined logical value in each vector $A_i$; and $WA_i$ denotes a bit width of each vector $A_i$, and $PC_j$ denotes each maximum power consumption caused by each vector $C_j$; $HC_j$ denotes each number of bits each having a predetermined logical value in each vector $C_j$; $WC_j$ denotes a bit width of each vector $C_j$, and where "constant" denotes a predetermined constant power consumption; or as $P=f= PA_1 \text{ xHA}_1 /WA_1+PA_2 \text{ xHA}_2 /WA_2+\ldots+PA_n \text{ xHA}_n /WA_n+ PC_1 \text{ xHC}_1 /WC_1+PC_2 \text{ xHC}_2 /WC_2+\ldots+PC_m \text{ XHC}_m /WC_m$+constant; or as $P=f(PA_i, HA_i, WA_i, \ldots, PC_j, HC_j, WC_j, \ldots)$+constant; or as $P=f=PA_i \text{ xHA}_i /WA_i+\ldots+PC_j \text{ xHC}_j /WC_j+\ldots$+constant.

Further, in the step of obtaining each power consumption, when n-units of vectors Ai are inputted to each detected function block, the power consumption P is calculated by use of an approximate expression as $P=f(PA_1, PA_2, \ldots, PA_n, HA_1, HA_2, \ldots, HA_n, WA_1, WA_2, \ldots, WA_n)$+constant, where n denotes one or more integer; i denotes an integer from one to n; $PA_i$ denotes each maximum power consumption caused by each vector $A_i$; $HA_i$ denotes each number of bits each of whose logical values changes in time transition from a preceding time to a current time in each vector $A_i$;

$WA_i$ denotes a bit width of each vector $A_i$, and where "constant" denotes a predetermined constant power consumption; or as $P=f=PA_1 \times HA_1 /WA_1+PA_2 \times HA_2 /WA_2+ \ldots +PA_n \times HA_n/WA_n+\text{constant}$; or as $P=f (PA_i, HA_i, WA_i)+\text{constant}$; or as $P=f=PA_i \times HA_i /WA_i+ \ldots +\text{constant}$.

Further, in the step of obtaining each power consumption, when n-units of vectors $A_i$ are inputted to each detected function block and m-units of vectors $C_j$ are outputted from each detected function block, the power consumption P is calculated by use of an approximate expression as $P=f (PA_1, PA_2, \ldots, PA_n, HA_1, HA_2, \ldots, HA_n, WA_1, WA_2, \ldots, WA_n, PC_1, PC_2, \ldots, PC_m, HC_1, HC_2, \ldots, HC_m, WC_1, WC_2, \ldots, WC_m)+\text{constant}$, where n and m denote integers of one or more, respectively; and i and j denote an integer from one to n and m, respectively; $PA_i$ denotes each maximum power consumption caused by each vector $A_i$; $HA_i$ denotes each number of bits each of whose logical values changes in time transition from a preceding time to a current time in each vector $A_i$; and $WA_i$ denotes a bit width of each vector $A_i$, and $PC_j$ denotes each maximum power consumption caused by each vector $C_j$; $HC_j$ denotes each number of bits each of whose logical values changes in time transition from a preceding time to a current time in each vector $C_j$; and $WC_j$ denotes a bit width of each vector $C_j$, and where "constant" denotes a predetermined constant power consumption; or as $P=f=PA_1 \times HA_1 /WA_1+PA_2 \times HA_2 /WA_2+ \ldots +PA_n \times HA_n /WA_n+PC_1 \times HC_1 /WC_1+PC_2 \times HC_2 /WC_2+ \ldots +PC_m \times HC_m /WC_m+\text{constant}$; or as $P=f (PA_i, HA_i, WA_i, \ldots, PC_j, HC_j, WC_j, \ldots)+\text{constant}$; or as $P=f=PA_i \times HA_i /WA_i+ \ldots +PC_j \times HC_j /WC_j+ \ldots +\text{constant}$.

Further, the present invention provides an apparatus for calculating power consumption of an integrated circuit having a plurality of function blocks, comprising: function block detecting means for detecting the function blocks required for a predetermined operation, in sequence; power consumption calculating means for calculating each power consumed when each of the function blocks detected by said function block detecting means is in operation; and power consumption summing means for summing up each power consumption calculated by said power consumption calculating means for each function block, to output the summed-up power consumption as a power consumption of the whole integrated circuit.

Here, it is preferable that the apparatus further comprises a table for storing each power consumed when each of the function blocks is in operation, said power consumption calculating means obtaining each power consumption of each of the detected function blocks by referring to the table.

Further, in the apparatus for calculating the power consumption of an integrated circuit, it is also possible to calculate each power consumption of each of the detected function blocks by use of any one of the above-mentioned various approximate expressions.

In the method and apparatus for calculating the power consumption of an integrated circuit according to the present invention, since the integrated circuit is composed of a plurality of function blocks, it is possible to calculate the power consumption in an upper design process. That is, in the method according to the present invention, it is possible to detect only necessary function blocks required for the operation in the upper design process and to calculate the total power consumption of the whole circuit. Since the power consumption can be optimized by estimating the power consumption in the upper design process, it is possible to reduce the design time and cost, as compared with the conventional method by which the power consumption can be estimated in only the lower design process.

DETAILED DESCRIPTION OF THE EMBODIMENTS

An embodiment of the present invention will be described hereinbelow with reference to the attached drawings. In this embodiment, the present invention is applied to calculate the power consumption of a microprocessor.

Figure 1:
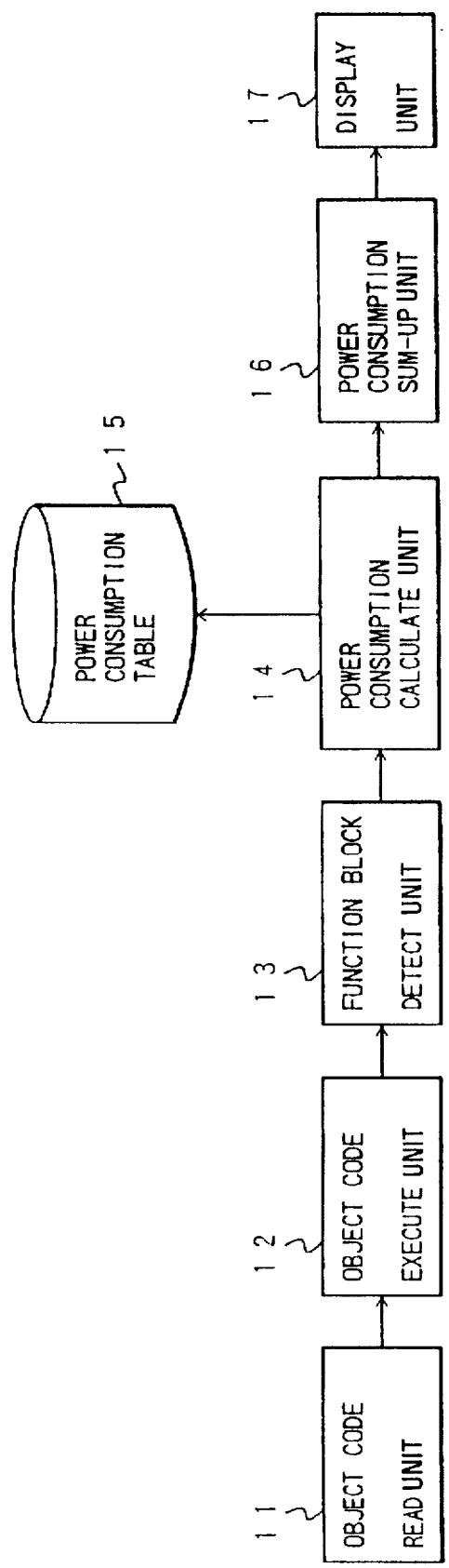
FIG. 1 is a block diagram showing a construction of an embodiment of the apparatus for calculating the power consumption of an integrated circuit according to the present invention.

FIG. 1 shows a construction of the embodiment of the apparatus of calculating a power consumption of an integrated circuit. The apparatus comprises object code reading unit 11, object code execute unit 12, function block detect unit 13, power consumption calculate unit 14, a power consumption table 15, power consumption sum-up unit 16 and display means 17.

Figure 2:
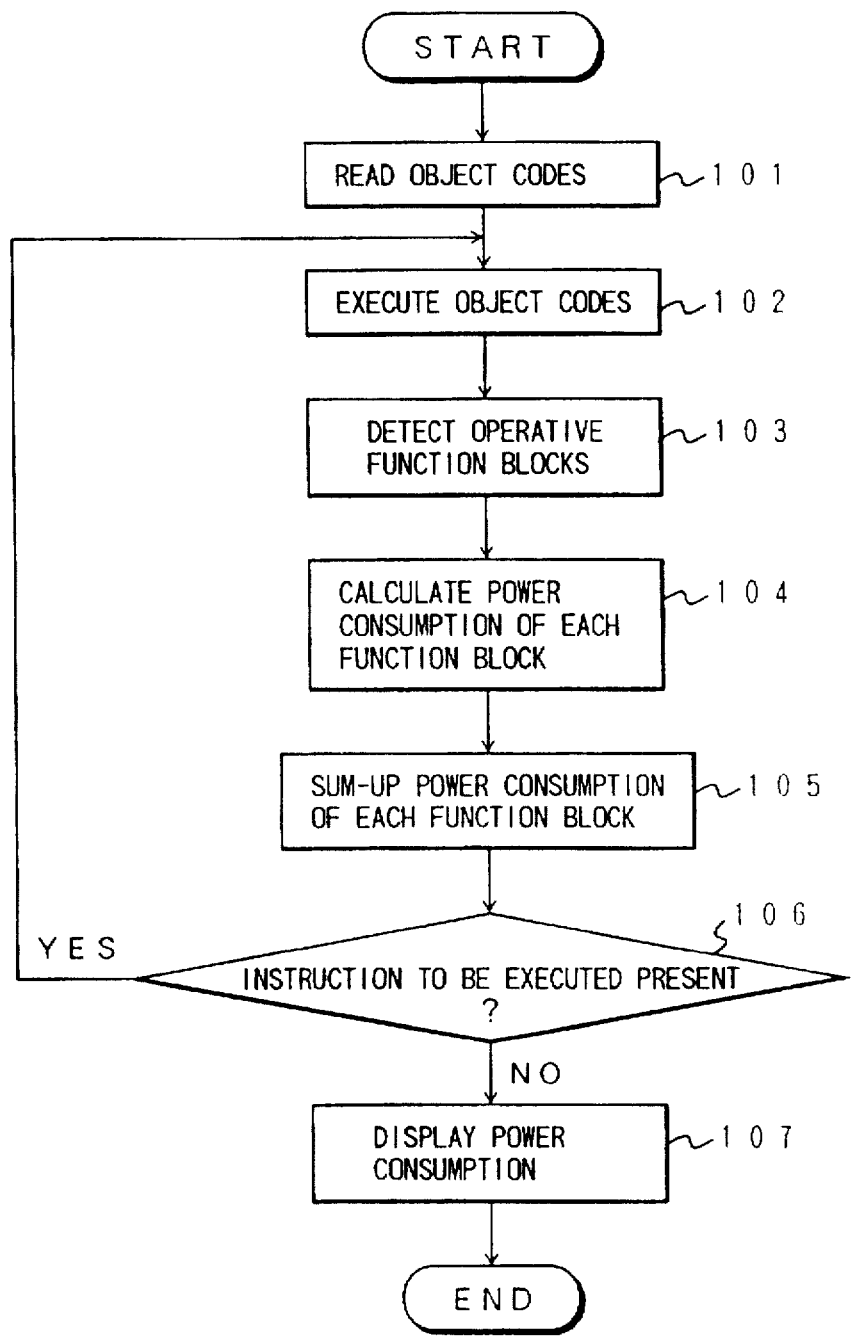
FIG. 2 is a flowchart showing a process procedure for assistance in explaining an embodiment of the method of calculating the power consumption of an integrated circuit according to the present invention.

The method of calculating the power consumption of an integrated circuit by use of the apparatus as described above will be explained with reference to the flowchart as shown in FIG. 2.

In step 101, a compiler (not shown) receives source codes, and compiles the received source codes into object codes. The compiled object codes are given to the object code read unit 11 and further to the object code execute unit 12.

In step 102, the object code execute unit 12 analyzes the given object codes to retrieve instructions, and further executes the analyzed instructions.

In step 103, the function block detect unit 13 detects the function blocks required to execute instructions from a plurality of function blocks of the microprocessor.

The case where instructions expressed by assembler codes, as shown below, are executed will be explained by way of example.

ADD r3, r1, r2 . . .    (1)

ADD r6, r4, r5 . . .    (2)

ADD r9, r7, r8 . . .    (3)

Figure 3:
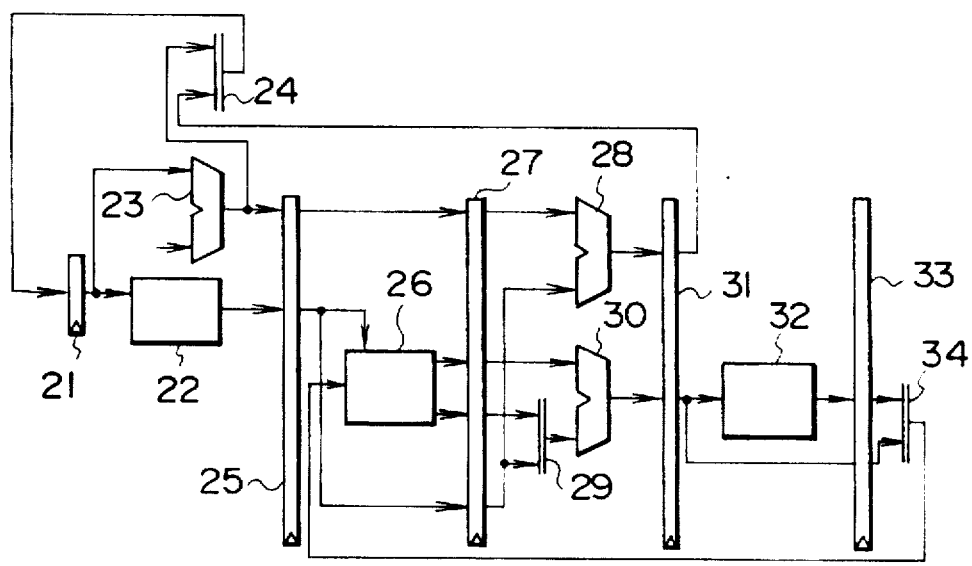
FIG. 3 is a model of the architecture design process of an integrated circuit (a microprocessor), whose power consumption can be calculated by use of the power consumption calculating method according to the present invention.
Figure 4:
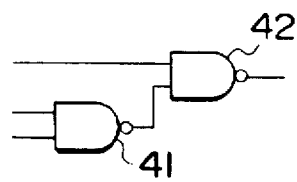
FIG. 4 is a circuit diagram showing an example of a logic circuit.
Figure 5:
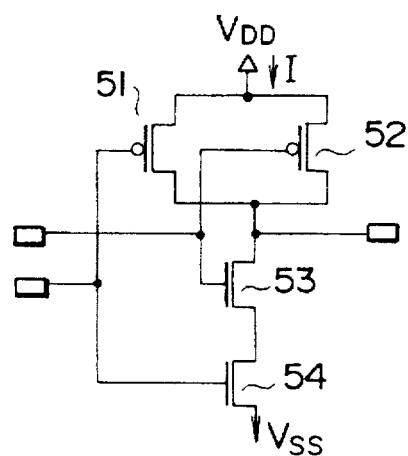
FIG. 5 is a circuit diagram showing an example of a transistor circuit.

When the instructions as expressed by the above expressions (1) to (3) are executed through pipeline control, necessary function blocks can be detected from all the function blocks 21 to 34 as shown in FIG. 3 as follows:

1. (at time t1) First, the instruction (1) is fetched. The function block detect unit 13 detects an instruction cache memory 22 as a function block required to fetch the instruction (1). Further, the function block detect unit 13 detects an incrementor 23 as a function block required to decide an address at the succeeding time.

2. (at time t2) The fetch of the instruction (2) starts. The operation from the fetch of the instruction (2) to the address decision at the succeeding time is the same as with the case of the instruction (1). That is, the function block detect unit 13 detects the instruction cache memory 22 and the incrementor 23 in sequence.

3. (at time t3) The instruction (1) is executed. That is, data in a register r1 is added to data in a register r2. Here, the function block detect unit 13 detects an arithmetic logic calculator 28 as the necessary function block required for the above-mentioned addition.

At the same time, the instruction (2) is decoded to detect a register file 26 as the function block required to read data from registers r4 and r5.

Further, at the same time, the instruction (3) is fetched. The operation from the fetch of the instruction (3) to the address decision at the succeeding time is the same as with the case of the instruction (1) or the instruction (2). That is, the function block detect unit 13 detects the instruction cache memory 22 and the incrementor 23 in sequence.

4. (at time t4) To execute the instruction (2), data in the register r4 is added to data in the register r5. Here, the function block detect unit 13 detects the arithmetic logic calculator 28 as the necessary function block required for the above-mentioned addition.

At the same time, the instruction (2) is decoded to detect the register file 26 as the function block required to read data from the registers r4 and r5.

Further, at the same time, as the function block required to decode the instruction (3), the register file 26 for reading data in a register r7 and data in a register r8 is detected.

As described above; function blocks necessary for the respective operations are detected in sequence.

In step 104, the power consumption calculate unit 14 calculates the power consumptions of all the detected function blocks. Here, the powers consumed when the respective function blocks are operated are previously registered in the power consumption table 15. Therefore, the power consumption calculate unit 14 calculates the power consumptions of the respective function blocks with reference to the power consumption table 15. Here, in this embodiment, it should be noted that the power consumption is calculated at the stage where the design does not proceed to the lower design process. In other words, since the logical circuit constructions or the transistor circuit constructions of the respective function blocks are not yet decided, it is necessary to determine the power consumptions thereof on the basis of experience.

In step 105, the power consumption sum-up unit 16 sums up the respective power consumptions of the respective function blocks to calculate a total circuit power consumption.

In step 106, the presence or absence of instructions to be executed is checked. If the instruction or instructions are present, the processing is repeated again from steps 102 to 105. If not present, control proceeds to step 107.

In step 107, the display unit 17 displays the final calculated power consumption.

Figure 6:
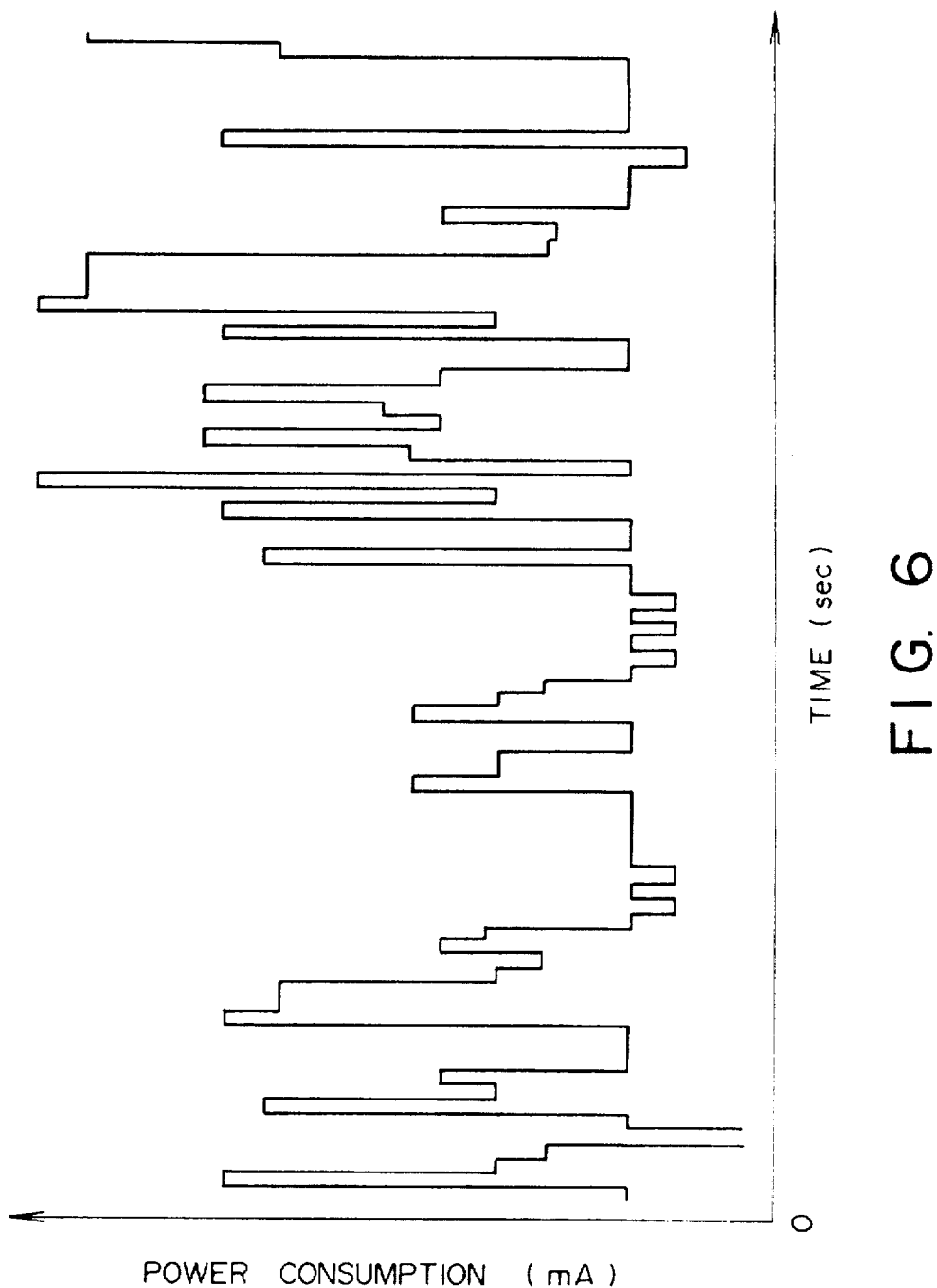
FIG. 6 is a diagram showing the power consumption calculated by the method of an embodiment.

In this case, the power consumption can be preferably displayed in the form of variation thereof with the lapse of time, as shown in FIG. 6.

In the above-mentioned embodiment, the power consumption is calculated by the power consumption calculate unit 14 in such a way that various power consumptions previously estimated for each function block are stored in the form of tables and the power consumptions of the respective function blocks are obtained with reference to the tables.

Without being limited only thereto, however, it is possible to calculate the power consumptions in accordance with approximate expressions, without use of any table, as follows:

For instance, in the case where the function block, required for some operation is the arithmetic logic calculator 30, since two vectors A and B are inputted to the arithmetic logic calculator 30, a following approximate expression (4) can be used.

$$P=PA \times HA /WA+PB \times HB /WB \qquad (4)$$

where WA denotes the bit width of the input vector A; WB denotes the bit width of the input vector B; HA denotes the number of bits of logic [1] in the input vector A; HB denotes the number of bits of logic [1] in the input vector B; PA denotes the power consumption caused by the input vector A when all the bits of the input vector A are at logic [1]; and PB denotes the power consumption caused by the input vector B when all the bits of the input vector B are at logic [1].

Or else, the power consumption can be obtained by use of an approximate expression (5), instead of the approximate expression (4).

$$P=PA \times CA /WA+PB \times CB /WB \qquad (5)$$

where CA denotes the number of bits whose levels change in time transition from the preceding time to the current time in the input vector A; and CB denotes the number of bits whose levels change in time transition from the preceding time to the current time in the input vector B.

Here, there exists a difference between the two approximate expressions (4) and (5) as follows: in the case where the approximate expression (4) is used, since the power consumption can be calculated by use of only the current logical values of the two input vectors A and B, it is unnecessary to take into account the variations of logic values with the lapse of time. As a result, the calculation is simple and thereby executed at a high speed. In addition, the capacity of memory required for calculation is relatively small.

In contrast with this, in the case where the approximate expression (5) is used, since the power consumption of when the logical values of the input vectors A and B change can be obtained, this method is suitable for calculating the power consumption of a CMOS circuit. This is because in the case of the CMOS circuit, the current flowing therethrough whenever the logical level changes exerts a greater influence upon the total power consumption of the CMOS circuit, as compared with the current flowing therethrough when the input vector stays at logic [1].

Or else, the power consumption can be obtained by use of an approximate expression (6), instead of the approximate expression (5).

$$P=PA \times CA /WA+PB \times CB /WB+PC \times CC /WC \qquad (6)$$

where WC denotes the bit width of an output vector C; CC denotes the number of bits whose levels change in time transition from the preceding time to the current time in the output vector C; and PC denotes the maximum power consumption caused by the output vector C.

Here, there exists a difference between the two approximate expressions (5) and (6) in the case where the power consumption is added by the arithmetic logic calculator 30, by way of example.

When the vectors A, B and C at the preceding time are assumed to be 0111, 0000 and 0111, and the vectors A, B and C at the present time are assumed to be 0111, 0001 and 1000 respectively, WA, WB and WC (the bit width) are all 4, and CA, CB and CC (the number of changed bits) are 0, 1 and 4, respectively. Therefore, P=PB in accordance with the approximate expression (5), and P=PB+4PC in accordance with the approximate expression (6). This is defined as a first case.

When the vectors A, B and C at the preceding time are assumed to be 0110, 0000 and 0110, and the vectors A, B and C at the preset time are assumed to be 0110, 0001 and 0111, respectively, WA, WB and WC are all 4, and CA, CB and CC are 0, 1 and 1, respectively. Therefore, P=PB in accordance with the approximate expression (5), and P=PB+PC in accordance with the approximate expression (6). This is defined as a second case.

In comparison between the first and second cases, the power consumption by the arithmetic logic calculator 30 is the same in both as far as the approximate expression (5) is used. In practice, however, since the carrier propagation occurs in the first case, the operating portions of the circuit in the arithmetic logic calculator 30 must be large, with the result that the power consumption in the first case must be large as compared with that of the second case. When the approximate expression (6) is used, on the other hand, since the power consumption (P=PB+4PC) of the arithmetic logic calculator 30 in the first case is larger than that (P=PB+PC) in the second case, it is possible to calculate the power consumption at a higher precision.

The comparison results between the two approximate expressions (5) and (6) in precision through simulation will be described hereinbelow.

When the approximate expressions based upon the power consumption calculating methods of the above-mentioned embodiment are used, since the power consumption is calculated on the basis of only the change in the vectors, even in the case where the power consumption is different from each other in the practical circuits, the same power consumption is to be obtained. In more detail, for instance, there exist power consumptions of $(2^4)^2=256$ sorts in the practical circuit. However, when the approximate expression (5) is used, there exists only power consumptions of 5×5=25 sorts; and when the approximate expression (6) is used, there exists only power consumptions of 5×5×5=125 sorts.

The precision of the approximate expression can be evaluated by obtaining the variance as defined by the following expression (7):

$$V(X) = \Sigma(x-u)^2 P(x) \qquad (7)$$

where V (X) denotes a variance of a set X; x denotes elements of the set X; u denotes an average value of the set X; and P (x) denotes a probability when x occurs.

the power consumption of the actual circuit is small, it is possible to consider that the approximate expression (5) or (6) is a high precision approximate expression.

Here, first, the case where a 4-bit ripple carry adder is selected as the arithmetic logic calculator 30 will be described hereinbelow.

When the approximate expression (5) (the former) in which the output is not taken into account is used, there exists the power consumptions of 5×5=25 sorts. On the other hand, when the approximate expression (6) (the latter) in which the output is taken into account is used, there exists the power consumptions of 5×5×5=125 sorts. In other words, five power consumptions of the approximate expression (6) correspond to one power consumption of the approximate expression (5). However, in the comparison in variance between both, only 23 of 125 power consumptions calculated by the latter approximate expression (6) exceed the variance of the power consumptions calculated by the former approximate expression (5). Further, the variance by the latter approximate expression (6) is 1.3 times larger than that by the former approximate expression (5) at the worst. On the other hand, the variance by the former approximate expression (5) (in which the output is not taken into account) is 51.0 times larger than that by the latter approximate expression (6) (in which the output is taken into account).

Further, secondly, the case where a 4-bit carry look-ahead adder is selected as the arithmetic logic calculator 30 will be described hereinbelow.

When the approximate expression (5) (the former) in which the output is not taken into account is used, there exists the power consumptions of 5×5=25 sorts. On the other hand, when the approximate expression (6) (the latter) in which the output is taken into account is used, there exists the power consumptions of 5×5×5=125 sorts. However, in the comparison in variance between both, only 20 of 125 power consumptions calculated by the latter approximate expression (6) exceed the variance of the power consumptions calculated by the former approximate expression (5). Further, the variance by the latter approximate expression (6) is 1.3 times larger than that by the former approximate expression (5) at the worst. On the other hand, the variance by the former approximate expression (5) (in which the output is not taken into account) is 9.0 times larger than that by the latter approximate expression (6) (in which the output is taken into account).

Table 1 lists the variances obtained when the variations of the input A is 4, in which the underlined variances indicate the variances (calculated by taking the output into account) which exceed the variance calculated without taking the output into account.

TABLE 1

| B/C | WITHOUT C | 0 | 1 | 2 | 3 | 4 |
|---|---|---|---|---|---|---|
| 0 | $1.8 \times 10^{-7}$ |  | $2.9 \times 10^{-8}$ | $2.6 \times 10^{-8}$ | $2.4 \times 10^{-8}$ | $2.0 \times 10^{-8}$ |
| 1 | $1.7 \times 10^{-7}$ | $3.0 \times 10^{-8}$ | $5.8 \times 10^{-8}$ | $1.6 \times 10^{-7}$ | $\underline{2.5 \times 10^{-7}}$ | $3.3 \times 10^{-8}$ |
| 2 | $2.3 \times 10^{-7}$ | $7.4 \times 10^{-8}$ | $1.6 \times 10^{-7}$ | $\underline{3.3 \times 10^{-7}}$ | $1.6 \times 10^{-7}$ | $5.0 \times 10^{-8}$ |
| 3 | $2.8 \times 10^{-7}$ | $1.6 \times 10^{-7}$ | $\underline{4.6 \times 10^{-7}}$ | $1.7 \times 10^{-7}$ | $5.8 \times 10^{-8}$ | $8.9 \times 10^{-8}$ |
| 4 | $3.4 \times 10^{-7}$ | $6.0 \times 10^{-8}$ | $3.3 \times 10^{-8}$ | $5.5 \times 10^{-8}$ | $1.1 \times 10^{-7}$ |  |

Accordingly, when different vectors are used in the approximate expression (5) or (6) in such a way that the same power consumption can be obtained, if the variance of Further, in Table 1 above, there are arranged from the right column in sequence the variations B, the variances without taking the output C into account, and the variances taking the output C into account (in which the variations of the output C are 0, 1, 2, 3 and 4, respectively).

As a result of the above-mentioned simulation, it can be understood that the calculation precision of the power consumption is high when the approximate expression (6) (in which the output C is taken into account) is used.

In the above description, there have been explained the approximate expression (4) expressed by using two input vectors A and B; the approximate expression (5) expressed by using the vectors whose levels change in time transition from the preceding time to the current time; and the approximate expression (6) expressed by using the two input vectors A and B and one output vector C, respectively. Here, however, other approximate expressions other than the above will be explained.

When n-units (n: one or more integer) of vectors A1 to $A_n$ are inputted to the function block, it is also possible to calculate the power consumption by use of a predetermined function f and a predetermined constant power consumption in accordance with the following expression (8):

$$P = f(A_1, A_2, \ldots, A_n) + \text{constant} \qquad (8)$$

Or else, without using all the input vectors of the function block, it is also possible to use a function f expressed by a predetermined number of vectors $A_i$ (i: an integer from one to n) in accordance with the following expression (9):

$$P = f(A_i, \ldots) + \text{constant} \qquad (9)$$

Further, when the n-units of input vectors $A_i$ are inputted to the function block, and where the bit widths of the input vectors $A_i$ are denoted by $WA_i$; the numbers of bits each having a predetermined logical value in the vectors $A_i$ are denoted by $HA_i$; and the maximum power consumptions caused by the vectors $A_i$ are denoted by $PA_i$ respectively, it is also possible to calculate the power consumption in accordance with the following approximate expression:

$$P = f(PA_1, PA_2, \ldots, PA_n, HA_1, HA_2, \ldots, HA_n, WA_1, WA_2, \ldots, WA_n) + \text{constant} \qquad (10)$$

The above-mentioned expression (10) is not limited only to a linear expression as shown by the following expression (11) but involves a quadratic non-linear expression as shown by the following expression (12):

$$P = f = PA_1 \, xHA_1 \, /WA_1 + PA_2 \, xHA_2 \, /WA_2 + \ldots + PA_n \, xHA_n \, /WA_n + \text{constant} \qquad (11)$$

$$P = f = PA_1 \, xHA_1^2 \, /WA_1 + PA_2 \, xHA_2^2 / WA_2 + \ldots + PA_n \, xHA_n^2 \, /WA_n + \text{constant} \qquad (12)$$

The above expression (12) is effective when the function block is a multiplier of array structure, for instance.

Further, in the above expression (10), all the input vectors A inputted to the function block are used. However, it is also possible to use any selected number of vectors $A_i$ as follows:

$$P = f(PA_i, HA_i, WA_i, \ldots) + \text{constant} \qquad (13)$$

Further, in this case, the above-mentioned expression (13) is not limited only to a linear expression as shown by the following expression (14) but involves a quadratic non-linear expression as shown by the following expression (14):

$$P = f = PA_i \, xHA_i \, /WA_i + \ldots + \text{constant} \qquad (14)$$

$$P = f = PA_i \, xHA_i^2 \, /WA_i + \ldots + \text{constant} \qquad (15)$$

Further, when n-units of vectors $A_i$ are inputted to the function block and further m-units (m: one or more integer) of vectors $C_j$ are outputted therefrom, the following expression (16) is used:

$$P = f(A_1, A_2, \ldots, A_n, C_1, C_2, \ldots, C_m) + \text{constant} \qquad (16)$$

Here, although the expression (16) involves all the vectors A inputted to the function block and all the vectors C outputted therefrom, it is also possible to use the following expression (17) expressed by only any selected numbers of the respective vectors $A_i$ and $C_j$ (j: an integer from one to m) as follows:

$$P = f(A_i, \ldots, C_j, \ldots) + \text{constant} \qquad (17)$$

Further, when the n-units of input vectors $A_i$ are inputted to the function block and the vectors $C_j$ are outputted therefrom, and where the bit widths of the input vectors $A_i$ are denoted by $WA_i$; the numbers of bits each having a predetermined logical level in the vectors $A_i$ are denoted by $HC_j$; and the maximum power consumptions caused by the vectors $C_j$ are denoted by $PC_j$ respectively, it is also possible to calculate the power consumption in accordance with the following approximate expression:

$$P = f(PA_1, PA_2, \ldots, PA_n, HA_1, HA_2, \ldots, HA_n, WA_1, WA_2, \ldots, WA_n, PC_1 PC_2, \ldots, PC_m, HC_1, HC_2, \ldots, HC_m, WC_1, WC_2, \ldots, WC_m) + \text{constant} \qquad (18)$$

Further, the above-mentioned expression (18) is not limited only to a linear expression as shown by the following expression (19) but involves a quadratic non-linear expression as shown by the following expression (20):

$$P = f = PA_1 \, xHA_1 \, /WA_1 + PA_2 \, xHA_2 \, /WA_2 + \ldots + PA_n \, xHA_n \, /WA_n + PA_n \, xHC_1 \, /WC_1 + PC_2 \, xHC_2 \, /WC_2 + \ldots + PC_n \, xHC_m \, /WC_m + \text{constant} \qquad (19)$$

$$P = f = PA_1 \, xHA_1^2 \, /WA_1 + PA_2 \, xHA_2^2 \, /WA_2 + \ldots + PA_n \, xHA_n^2 \, /WA_n + PA_1 \, XHC_1^2 \, /WC_1 + PC_2 \, xHC_2^2 \, /WC_2 + \ldots + PC_m \, xHC_m^2 \, /WC_m + \text{constant} \qquad (20)$$

Here, it is also possible to use any selected number of input vectors $A_i$ and output vector $C_j$ as follows:

$$P = f(PA_i, HA_i, WA_i, \ldots, C_j, HC_j, WC_j, \ldots) + \text{constant} \qquad (21)$$

Further, in this case, the above-mentioned expression (21) is not limited only to a linear expression as shown by the following expression (22) but involves a quadratic non-linear expression (23) as follows:

$$P = f = PA_i \, xHA_i \, /WA_i + \ldots + C_j \, xHC_j \, /Wc_j + \ldots + \text{constant} \qquad (22)$$

$$P = f = PA_i \, xHA_i^2 \, /WA_i + \ldots + xHC_j^2 \, /WC_j + \ldots + \text{constant} \qquad (23)$$

Further, when the n-units of input vectors $A_i$ are inputted to the function block, and where the bit widths of the vectors $A_i$ are denoted by $WA_i$; the numbers of bits each of whose logical values changes in time transition from the preceding time to the current time in the vectors $A_i$ are denoted by $HA_i$; and the maximum power consumptions caused by the vectors $A_i$ are denoted by $PA_i$, it is also possible to calculate the power consumption in accordance with the following approximate expression:

$$P = f(PA_1, PA_2, \ldots, PA_n, HA_1, HA_2, \ldots, HA_n, WA_1, WA_2, \ldots, WA_n) + \text{constant} \qquad (24)$$

Further, the above-mentioned expression (24) is not limited only to a linear expression as shown by the following expression (25) but involves a quadratic non-linear expression as shown by the following expression (26):

$$P=f=PA_1 xHA_1 /WA_1+PA_2 xHA_2 /WA_2+\ldots+PA_n xHA_n /WA_n+\text{constant} \quad (25)$$

$$P=f=PA_1 xHA_1^2 /WA_1+PA_2 xHA_2^2 /WA_2+\ldots+PA_n xHA_n^2 /WA_n+\text{constant} \quad (26)$$

Here, it is also possible to use any selected number of input vectors $A_i$ and output vector $C_j$ as follows:

$$P=f(PA_i, HA_i, WA_i, \ldots)+\text{constant} \quad (27)$$

Further, in this case, the above-mentioned expression (27) is not limited only to a linear expression as shown by the following expression (28) but involves a quadratic non-linear expression (29) as follows:

$$P=f=PA_i xHA_i /WA_i+\ldots+\text{constant} \quad (28)$$

$$P=f=PA_i xHA_i^2 /WA_i+\ldots+\text{constant} \quad (29)$$

Further, when the n-units of input vectors $A_i$ are inputted to the function block and further the m-units of the vectors $C_j$ are outputted therefrom, and further where the bit widths of the vectors $A_i$ are denoted by $WA_i$; the numbers of bits each of whose logical values changes in time transition from the preceding time to the current time in the vectors $A_i$ are denoted by $HA_i$; the maximum power consumptions caused by the vectors $A_i$ are denoted by $PA_i$; the bit widths of the vectors $C_j$ are denoted by $WC_j$; the numbers of bits each of whose logical values changes in time transition from the preceding time to the current time in the vectors $C_j$ are denoted by $HC_j$; and the maximum power consumptions caused by the vectors $C_j$ are denoted by $PC_j$, it is also possible to calculate the power consumption in accordance with the following approximate expression (30) by use of any selected numbers of the respective vectors $A_i$ and $C_j$:

$$P=f=PA_i, HA_i, WA_i, \ldots, C_j, HC_j, WC_j, \ldots)+\text{constant} \quad (30)$$

Further, in this case, the above-mentioned expression (30) is not limited only to a linear expression as shown by the following expression (31) but involves a quadratic non-linear expression (32) as follows:

$$P=f=PA_i xHA_i /WA_i+\ldots+C_j xHC_j /WC_j+\ldots+\text{constant} \quad (31)$$

$$P=f=PA_i xHA_i^2 /WA_i+\ldots+C_j xHC_j^2 /WC_j+\ldots+\text{constant} \quad (32)$$

When the n-units of input vectors $A_1$ are inputted to the function block, and where the vectors $A_1$ at a current time are denoted by $A_i(t)$; and the vectors $A_1$ at a preceding time are denoted by $A_i(t-1)$, it is possible to calculate the power consumption in accordance with the following approximate expression (33):

$$P=f(A_1(t), A_1(t-1), A_2(t), A_2(t-1), \ldots, A_n(t), A_n(t-1))+\text{constant} \quad (33)$$

When the n-units of input vectors $A_i$ are inputted to the function block and m-units of output vectors are outputted to the function block, and where the vectors $A_i$ at a current time are denoted by $A_i(t)$; the vectors $A_i$ at a preceding time are denoted by $A_i(t-1)$, the vectors $C_j$ at a current time are denoted by $C_j(t)$; and the vectors $C_j$ at a preceding time are denoted by $C_j(t-1)$, it is possible to calculate the power consumption in accordance with the following approximate expression (34):

$$P=f(A_1(t), A_1(t-1), A_2(t), A_2(t-1), \ldots, A_n(t), A_n(t-1), C_1(t), C_1(t-1), C_2(t), C_2(t-1), \ldots, C_m(t), C_m(t-1))+\text{const} \quad (34)$$

As described above, in the power consumption calculating method according to the present invention, the power consumption can be calculated even in the upper design process such as the architecture design process. As a result, it is possible to optimize the power consumption and thereby to reduce the design time and cost, as compared with the conventional method by which the power consumption can be estimated in only the lower design process such as the logic circuit design or the transistor circuit design.

What is claimed is:

1. A method of using a computer to calculate an approximate power consumption of an integrated circuit having a plurality of upper-level function blocks, at least one of said function blocks having a different function with respect to another of said function blocks, said computer being connected to an output unit, said method comprising the steps of:

detecting the function blocks which are operative during a predetermined operation;

determining a power consumption in operation of each of the detected function blocks;

summing up the power consumption determined for each detected function block; and outputting data corresponding to the summed-up power consumption as the approximate power consumption of the integrated circuit to the output unit.

2. The method of using a computer to calculate an approximate power consumption of an integrated circuit of claim 1, wherein, in the step of determining the power consumption of each of the detected function blocks, the power consumption is determined by referring to a table in which a previously registered power consumption is stored for each of the plurality of function blocks.

3. The method of using a computer to calculate an approximate power consumption of an integrated circuit of claim 1, wherein, in the step of determining the power consumption of each of the detected function blocks, when n-units of vectors $A_i$ are inputted to one of the detected function blocks, the power consumption of the one detected function block, denoted by P, is calculated by use of an approximate expression represented by a predetermined function, denoted by f, and a constant power consumption as follows:

$$P=f(A_1, A_2, \ldots, A_n)+\text{constant power consumption}$$

where n denotes an integer of one or more; and i denotes an integer from one to n.

4. The method of using a computer to calculate an approximate power consumption of an integrated circuit of claim 1, wherein, in the step of determining the power consumption of each of the detected function blocks, when n-units of vectors $A_i$ are inputted to one of the detected function blocks, the power consumption of the one detected function block, denoted by P, is calculated by use of an approximate expression represented by a predetermined function, denoted by f, determined on the basis of any selected number of the vectors $A_i$, and a constant power consumption as follows:

$$P=f(A_i, \ldots)+\text{constant power consumption}$$

where n denotes an integer of one or more; and i denotes an integer from one to n.

5. The method of using a computer to calculate an approximate power consumption of an integrated circuit of claim 1, wherein, in the step of determining the power consumption of each of the detected function blocks, when n-units of vectors $A_i$ are inputted to one of the detected function blocks and m-units of vectors $C_j$ are outputted from the one detected function block, the power consumption of the one detected function block, denoted by P, is calculated by use of an approximate expression represented by a predetermined function, denoted by f, and a constant power consumption as follows:

$$P=f(A_1, A_2, \ldots A_n, C_1, C_2, \ldots, C_m) + \text{constant power consumption}$$

where n and m denote integers of one or more, respectively; and i and j denote an integer from one to n and m, respectively.

6. The method of using a computer to calculate an approximate power consumption of an integrated circuit of claim 1, wherein, in the step of determining the power consumption of each of the detected function blocks, when n-units of vectors $A_i$ are inputted to one of the detected function blocks and m-units of vectors $C_j$ are outputted from the one detected function block, the power consumption of the one detected function block, denoted by P, is calculated by use of an approximate expression represented by a predetermined function, denoted by f, determined on the basis of any selected numbers of the respective vectors $A_i$ and $C_j$, and a constant power consumption as follows:

$$P=f(A_i, \ldots, C_j, \ldots) + \text{constant power consumption}$$

where n and m denote integers of one or more, respectively; and i and j denote an integer from one to n and m, respectively.

7. The method of using a computer to calculate an approximate power consumption of an integrated circuit of claim 1, wherein, in the step of determining the power consumption of each of the detected function blocks, when n-units of vectors $A_i$ are inputted to one of the detected function blocks, the power consumption of the one detected function block, denoted by P, is calculated by use of an approximate expression represented by a predetermined function, denoted by f, and a constant power consumption as follows:

$$P=f(A_1(t), A_1(t-1), A_2(t), A_2(t-1), \ldots, A_n(t), A_n(t-1)) + \text{constant power consumption}$$

where n denotes an integer of one or more; i denotes an integer from one to n; $A_i(t)$ denotes $A_i$ at a current time; and $A_i(t-1)$ denotes $A_i$ at a preceding time.

8. The method of using a computer to calculate an approximate power consumption of an integrated circuit of claim 1, wherein, in the step of determining the power consumption of each of the detected function blocks, when n-units of vectors $A_i$ are inputted to one of the detected function blocks and m-units of vectors $C_j$ are outputted from the one detected function block, the power consumption of the one detected function block, denoted by P, is calculated by use of an approximate expression represented by a predetermined function, denoted by f, and a constant power consumption as follows:

$$P=f(A_1(t), A_1(t-1), A_2(t), A_2(t-1), \ldots, A_n(t), A_n(t-1), C_1(t), C_1(t-1), C_2(t), C_2(t-1), \ldots, C_m(t), C_m(t-1)) + \text{constant power consumption}$$

where n denotes an integer of one or more; m denotes an integer of one or more; i denotes an integer from one to n; j denotes an integer from one to m; $A_i(t)$ denotes $A_i$ at a current time; $A_i(t-1)$ denotes $A_i$ at a preceding time; $C_j(t)$ denotes $C_j$ at a current time; and $C_j(t-1)$ denotes $C_j$ at a preceding time.

9. The method of using a computer to calculate an approximate power consumption of an integrated circuit of claim 1, wherein, in the step of determining the power consumption of each of the detected function blocks, when n-units of vectors $A_i$ are inputted to one of the detected function blocks, the power consumption of the one detected function block, denoted by P, is calculated by use of an approximate expression represented by a predetermined function, denoted by f, and a constant power consumption as follows:

$$P=f(PA_1, PA_2, \ldots, PA_n, HA_1, HA_2, HA_n, WA_1, WA_2, \ldots, WA_n) + \text{constant power consumption}$$

where n denotes an integer of one or more; i denotes an integer from one to n; $PA_i$ denotes a respective maximum power consumption caused by each vector $A_i$; $HA_i$ denotes a respective number of bit s having a predetermined logical value in each vector $A_i$; and $WA_i$ denotes a respective bit width of each vector $A_i$.

10. The method of using a computer to calculate an approximate power consumption of an integrated circuit of claim 9, wherein the predetermined function f is expressed as $$P=f=PA_1 \times HA_1 / WA_1 + PA_2 \times HA_2 / WA_2 + \ldots + PA_n \times HA_n / WA_n + \text{constant power consumption.}$$

11. The method of using a computer to calculate an approximate power consumption of an integrated circuit of claim 1, wherein, in the step of determining the power consumption of each of the detected function blocks, when n-units of vectors $A_i$ are inputted to one of the detected function blocks, the power consumption of the one detected function block, denoted by P, is calculated by use of an approximate expression represented by a predetermined function, denoted by f, determined on the basis of any selected number of the vectors $A_i$, and a constant power consumption as follows:

$$P=f(PA_i, HA_i, WA_i, \ldots) + \text{constant power consumption}$$

where n denotes an integer of one or more; i denotes an integer from one to n; $PA_i$ denotes a respective maximum power consumption caused by each vector $A_i$; $HA_i$ denotes a respective number of bits having a predetermined logical value in each vector $A_i$; and $WA_i$ denotes a respective bit width of each vector $A_i$.

12. The method of using a computer to calculate an approximate power consumption of an integrated circuit of claim 11, wherein the predetermined function f is expressed as $$P=f=PA_i \times HA_i / WA_i + \ldots + \text{constant power consumption.}$$

13. The method of using a computer to calculate an approximate power consumption of an integrated circuit of claim 1, wherein, in the step of determining the power consumption of each of the detected function blocks, when n-units of vectors $A_i$ are inputted to one of the detected function blocks and m-units of vectors $C_j$ are outputted from the one detected function block, the power consumption of the one detected function block, denoted by P, is calculated by use of an approximate expression represented by a predetermined function, denoted by f, and a constant power consumption as follows:

$$P=f(PA_1, PA_2, \ldots PA_m, HA_1, HA_2 \ldots, HA_n, WA_1, WA_2 \ldots, WA_n, PC_1, PC_2, \ldots, PC_m, HC_1, HC_2, \ldots, HC_m, WC_1, WC_2, \ldots, WC_m)+\text{constant power consumption}$$

where n and m denote integers of one or more, respectively; and i and j denote an integer from one to n and m, respectively; $PA_i$ denotes a respective maximum power consumption caused by each vector $A_i$; $HA_i$ denotes a respective number of bits having a predetermined logical value in each vector $A_i$; and $WA_i$ denotes a respective bit width of each vector $A_i$, and $PC_j$ denotes a respective maximum power consumption caused by each vector $C_j$; $HC_j$ denotes a respective number of bits having a predetermined logical value in each vector $C_j$; and $WC_j$ denotes a respective bit width of each vector $C_j$.

14. The method of using a computer to calculate an approximate power consumption of an integrated circuit of claim 13, wherein the predetermined function f is expressed as $$P=f=PA_1 \, xHA_1 /WA_1+PA_2 \, xHA_2 /WA_2+\ldots+PA_n \, xHA_n /WA_n+PC_1 \, xHC_1 /WC_1+PC_2 \, xHC_2 /WC_2+\ldots+PC_m \, xHC_m /WC_m+\text{constant power consumption}.$$

15. The method of using a computer to calculate an approximate power consumption of an integrated circuit of claim 1, wherein, in the step of determining the power consumption of each of the detected function blocks, when n-units of vectors $A_i$ are inputted to one of the detected function blocks and m-units of vectors $C_j$ are outputted from the one detected function block, the power consumption of the one detected function block, denoted by P, is calculated by use of an approximate expression represented by a predetermined function, denoted by f, determined on the basis of any selected numbers of the respective vectors $A_i$ and $C_j$, and a constant power consumption as follows:

$$P=f(PA_i, HA_i, WA_i, \ldots, PC_j, HC_j, WC_j, \ldots)+\text{constant power consumption}$$

where n and m denote integers of one or more, respectively; i and j denote an integer from one to n and m, respectively; $PA_i$ denotes a respective maximum power consumption caused by each vector $A_i$; $HA_i$ denotes a respective number of bits having a predetermined logical value in each vector $A_i$; and $WA_i$ denotes a respective bit width of each vector $A_i$; $PC_j$ denotes a respective maximum power consumption caused by each vector $C_j$; $HC_j$ denotes a respective number of bits having a predetermined logical value in each vector $C_j$; and $WC_j$ denotes a respective bit width of each vector $C_j$.

16. The method of using a computer to calculate an approximate power consumption of an integrated circuit of claim 15, wherein the predetermined function f is expressed as $$P=f=PA_i \, xHA_i /WA_i+\ldots+PC_j \, xHC_j /WC_j+\ldots+\text{constant power consumption}.$$

17. The method of using a computer to calculate an approximate power consumption of an integrated circuit of claim 1, wherein, in the step of determining the power consumption of each of the detected function blocks, when n-units of vectors $A_i$ are inputted to one of the detected function blocks, the power consumption of the one detected function block, denoted by P, is calculated by use of an approximate expression represented by a predetermined function, denoted by f, and a constant power consumption as follows:

$$P=f(PA_1, PA_2, \ldots, PA_m, HA_1, HA_2, \ldots, HA_n, WA_1, WA_2, \ldots, WA_n)+\text{constant power consumption}$$

where n denotes an integer of one or more; i denotes an integer from one to n; $PA_i$ denotes a respective maximum power consumption caused by each vector $A_i$; $HA_i$ denotes a respective number of bits having logical values which change in a time transition from a preceding time to a current time in each vector $A_i$; and $WA_i$ denotes a respective bit width of each vector $A_i$.

18. The method of using a computer to calculate an approximate power consumption of an integrated circuit of claim 17 wherein the predetermined function f is expressed as $$P=f=PA_1 \, xHA_1 /WA_1+PA_2 \, xHA_2 /WA_2+\ldots+PA_n \, xHA_n /WA_n+\text{constant power consumption}.$$

19. The method of using a computer to calculate an approximate power consumption of an integrated circuit of claim 1, wherein, in the step of determining the power consumption of each of the detected function blocks, when n-units of vectors $A_i$ are inputted to one of the detected function blocks, the power consumption of the one detected function block, denoted by P, is calculated by use of an approximate expression represented by a predetermined function, denoted by f, determined on the basis of any selected number of the vectors $A_i$, and a constant power consumption as follows:

$$P=f(PA_i, HA_i, WA_i, \ldots)+\text{constant power consumption}$$

where n denotes an integer of one or more; i denotes an integer between one and n; $PA_i$ denotes a respective maximum power consumption caused by each vector $A_i$; $HA_i$ denotes a respective number of bits having logical values which change in a time transition from a preceding time to a current time in each vector $A_i$; and $WA_i$ denotes a respective bit width of each vector $A_i$.

20. The method of using a computer to calculate an approximate power consumption of an integrated circuit of claim 19; wherein the predetermined function f is expressed as $$P=f=PA_i \, xHA_i /WA_i+\ldots+\text{constant power consumption}.$$

21. The method of using a computer to calculate an approximate power consumption of an integrated circuit of claim 1, wherein, in the step of determining the power consumption of each of the detected function blocks, when n-units of vectors $A_i$ are inputted to one of the detected function blocks and m-units of vectors $C_j$ are outputted from the one detected function block, the power consumption of the one detected function block, denoted by P, is calculated by use of an approximate expression represented by a predetermined function, denoted by f, and a constant power consumption as follows:

$$P=f(PA_1, PA_2, \ldots, PA_m, HA_1, HA_2, \ldots, HA_n, WA_1, WA_2, \ldots, WA_n, PC_1, PC_2, \ldots, PC_m, HC_1, HC_2, \ldots, HC_m, WC_1, WC_2, \ldots, WC_m)+\text{constant power consumption}$$

where n and m denote integers of one or more, respectively; and i and j denote an integer from one to n and m, respectively; $PA_i$ denotes a respective maximum power consumption caused by each vector $A_i$; $HA_i$ denotes a respective number of bits having logical values which change in a time transition from a preceding time to a current time in each vector $A_i$; and $WA_i$ denotes a respective bit width of each vector $A_i$, and $PC_j$ denotes a respective maximum power consumption caused by each vector $C_j$; $HC_j$ denotes a respective number of bits having logical values which change in a time transition from a preceding time to a current time in each vector $C_j$; and $WC_j$ denotes a respective bit width of each vector $C_j$.

22. The method of using a computer to calculate an approximate power consumption of an integrated circuit of claim 21, wherein the predetermined function f is expressed as $$P = f = PA_1 \, xHA_1 \, /WA_1 + PA_2 \, xHA_2 \, /WA_2 + \ldots + PA_n \, xHA_n \, /WA_n + PC_1 \, xHC_1 \, /WC_1 + PC_2 \, xHC_2 \, /WC_2 + \ldots + PC_m \, xHC_m \, /WC_m + \text{constant power consumption}.$$

23. The method of using a computer to calculate an approximate power consumption of an integrated circuit of claim 1, wherein, in the step of determining the power consumption of each of the detected function blocks, when n-units of vectors $A_i$ are inputted to one of the detected function blocks and m-units of vectors $C_j$ are outputted from the one detected function block, the power consumption of the one detected function block, denoted by P, is calculated by use of an approximate expression represented by a predetermined function, denoted by f, determined on the basis of any selected numbers of the respective vectors $A_i$ and $C_j$, and a constant power consumption as follows:

$$P = f(PA_i, HA_i, WA_i, \ldots, PC_j, HC_j, WC_j, \ldots) + \text{constant power consumption}$$

where n and m denote integers of one or more, respectively; i and j denote an integer from one to n and m, respectively; $PA_i$ denotes a respective maximum power consumption caused by each vector $A_i$; $HA_i$ denotes a respective number of bits having logical values which change in a time transition from a preceding time to a current time in each vector $A_i$; and $WA_i$ denotes a respective bit width of each vector $A_i$; $PC_j$ denotes a respective maximum power consumption caused by each vector $C_j$; $HC_j$ denotes a respective number of bits having logical values which change in a time transition from a preceding time to a current time in each vector $C_j$; and $WC_j$ denotes a respective bit width of each vector $C_j$.

24. The method of using a computer to calculate an approximate power consumption of an integrated circuit of claim 23, wherein the predetermined function f is expressed as $$P = f = PA_i \, xHA_i \, /WA_i + \ldots + PC_j \, xHC_j \, /WC_j + \ldots + \text{constant power consumption}.$$

25. An apparatus for calculating an approximate power consumption of an integrated circuit having a plurality of upper-level function blocks, at least one of said function blocks having a different function with respect to another of said function blocks, comprising:

function block detecting means for detecting the function blocks which are operative during a predetermined operation;

power consumption calculating means for calculating a respective power consumption of each of the detected function blocks when each of the detected function blocks is in operation; and power consumption summing means for summing up the respective power consumption calculated by said power consumption calculating means for each detected function block, said power consumption summing means providing the summed-up power consumption as the approximate power consumption of the integrated circuit.

26. The apparatus for calculating an approximate power consumption of an integrated circuit of claim 25, further comprising a table for storing a predetermined power consumed when each of the function blocks is in operation, said power consumption calculating means determining the respective power consumption of each of the detected function blocks by referring to said table.

27. The apparatus for calculating an approximate power consumption of an integrated circuit of claim 25, wherein when n-units of vectors $A_i$ are inputted to one of the detected function blocks, said power consumption calculating means calculates the power consumption of the one detected function block, denoted by P, by use of an approximate expression represented by a predetermined function, denoted by f, and a constant power consumption as follows:

$$P = f(A_1, A_2, \ldots, A_n) + \text{constant power consumption}$$

where n denotes an integer of one or more; and i denotes an integer from one to n.

28. The apparatus for calculating an approximate power consumption of an integrated circuit of claim 25, wherein when n-units of vectors $A_i$ are inputted to one of the detected function blocks, said power consumption calculating means calculates the power consumption of the one detected function block, denoted by P, by use of an approximate expression represented by a predetermined function, denoted by f, determined on the basis of any selected number of the vectors $A_i$, and a constant power consumption as follows:

$$P = f(A_i, \ldots) + \text{constant power consumption}$$

where n denotes an integer of one or more; and i denotes an integer from one to n.

29. The apparatus for calculating an approximate power consumption of an integrated circuit of claim 25, wherein when n-units of vectors $A_i$ are inputted to one of the detected function blocks and m-units of vectors $C_j$ are outputted from the one detected function block, said power consumption calculating means calculates the power consumption of the one detected function block, denoted by P, by use of an approximate expression represented by a predetermined function, denoted by f, and a constant power consumption as follows:

$$P = f(A_1, A_2, \ldots, A_n, C_1, C_2, \ldots, C_m) + \text{constant power consumption}$$

where n and m denote integers of one or more, respectively; and i and j denote an integer from one to n and m, respectively.

30. The apparatus for calculating an approximate power consumption of an integrated circuit of claim 25, wherein when n-units of vectors $A_i$ are inputted to one of the detected function blocks and m-units of vectors $C_j$ are outputted from the one detected function block, said power consumption calculating means calculates the power consumption of the one detected function block, denoted by P, by use of an approximate expression represented by a predetermined function, denoted by f, determined on the basis of any selected numbers of the respective vectors $A_i$ and $C_j$, and a constant power consumption as follows:

$$P = f(A_i, \ldots, C_j, \ldots) + \text{constant power consumption}$$

where n and m denote integers of one or more, respectively; and i and j denote an integer from one to n and m, respectively.

31. The apparatus for calculating an approximate power consumption of an integrated circuit of claim 25, wherein when n-units of vectors $A_i$ are inputted to one of the detected function blocks, said power consumption calculating means calculates the power consumption of the one detected function block, denoted by P, by use of an approximate expression represented by a predetermined function, denoted by f, and a constant power consumption as follows:

$$P = f(A_1(t), A_1(t-1), A_2(t), A_2(t-1), \ldots, A_n(t), A_n(t-1)) + \text{constant power consumption}$$

where n denotes an integer of one or more; i denotes an integer from one to n; $A_i(t)$ denotes $A_i$ at a current time; and $A_i(t-1)$ denotes $A_i$ at a preceding time.

32. The apparatus for calculating an approximate power consumption of an integrated circuit of claim 25, wherein when n-units of vectors $A_i$ are inputted to one of the detected function blocks and m-units of vectors C are outputted from the one detected function block, said power consumption calculating means calculates the power consumption of the one detected function block, denoted by P, by use of an approximate expression represented by a predetermined function, denoted by f, and a constant power consumption as follows:

$$P = f(A_1(t), A_1(t-1), A_2(t), A_2(t-1), \ldots, A_n(t), A_n(t-1), C_1(t), C_1(t-1), C_2(t), C_2(t-1), \ldots, C_m(t), C_m(t-1)) + \text{constant power consumption}$$

where n denotes an integer of one or more; m denotes an integer of one or more; i denotes an integer from one to n; j denotes an integer from one to m; $A_i(t)$ denotes $A_i$ at a current time; $A_i(t-1)$ denotes $A_i$ at a preceding time; $C_j(t)$ denotes $C_j$ at a current time; and $C_j(t-1)$ denotes $C_j$ at a preceding time.

33. The apparatus for calculating an approximate power consumption of an integrated circuit of claim 25, wherein when n-units of vectors A, are inputted to one of the detected function blocks, said power consumption calculating means calculates the power consumption of the one detected function block, denoted by P, by use of an approximate expression represented by a predetermined function, denoted by f, and a constant power consumption as follows:

$$P = f(PA_1, PA_2, \ldots, PA_n, HA_1, HA_2, \ldots, HA_n, WA_1, WA_2, \ldots, WA_n) + \text{constant power consumption}$$

where n denotes an integer of one or more; i denotes an integer from one to n; $PA_i$ denotes a respective maximum power consumption caused by each vector $A_i$; $HA_i$ denotes a respective number of bits having a predetermined logical value in each vector $A_i$; and $WA_i$ denotes a respective bit width of each vector $A_i$.

34. The apparatus for calculating an approximate power consumption of an integrated circuit of claim 33, wherein the predetermined function f is expressed as $$P = f = PA_1 \cdot XHA_1 / WA_1 + PA_2 \cdot xHA_2 / WA_2 + \ldots + PA_n \cdot xHlA_n / WA_n + \text{constant power consumption.}$$

35. The apparatus for calculating an approximate power consumption of an integrated circuit of claim 25, wherein when n-units of vectors $A_i$ are inputted to one of the detected function blocks, said power consumption calculating means calculates the power consumption of the one detected function block, denoted by P, by use of an approximate expression represented by a predetermined function, denoted by f, determined on the basis of any selected number of the vectors $A_i$, and a constant power consumption as follows:

$$P = f(PA_i, HA_i, WA_i, \ldots) + \text{constant power consumption}$$

where n denotes an integer of one or more; i denotes an integer from one to n; $PA_i$ denotes a respective maximum power consumption caused by each vector $A_i$; $HA_i$ denotes a respective number of bits having a predetermined logical value in each vector $A_i$; and $WA_i$ denotes a respective bit width of each vector $A_i$.

36. The apparatus for calculating an approximate power consumption of an integrated circuit of claim 35, wherein the predetermined function f is expressed as $$P = f = PA_i \cdot xHA_i / WA_i + \ldots + \text{constant power consumption.}$$

37. The apparatus for calculating an approximate power consumption of an integrated circuit of claim 25, wherein when n-units of vectors $A_i$ are inputted to one of the detected function blocks and m-units of vectors $C_j$ are outputted from the one detected function block, said power consumption calculating means calculates the power consumption of the one detected function block, denoted by P, by use of an approximate expression represented by a predetermined function, denoted by f, and a constant power consumption as follows:

$$P = f(PA_1, PA_2, \ldots, PA_m, HA_1, HA_2, \ldots, HA_m, WA_1, WA_2, \ldots, WA_m, PC_1, PC_2, \ldots, PC_m, HC_1, HC_2, \ldots, HC_m, WC_1, WC_2, \ldots, WC_m) + \text{constant power consumption}$$

where n and m denote integers of one or more, respectively; and i and j denote an integer from one to n and m, respectively; $PA_i$ denotes a respective maximum power consumption caused by each vector $A_i$; $HA_i$ denotes a respective number of bits having a predetermined logical value in each vector $A_i$; and $WA_i$ denotes a respective bit width of each vector $A_i$, and $PC_j$ denotes a respective maximum power consumption caused by each vector $C_j$; $HC_j$ denotes a respective number of bits having a predetermined logical value in each vector $C_j$; and $WC_j$ denotes a respective bit width of each vector $C_j$.

38. The apparatus for calculating an approximate power consumption of an integrated circuit of claim 37, wherein the predetermined function f is expressed as $$P = f = PA_1 \cdot xHA_1 / WA_1 + PA_2 \cdot xHA_2 / WA_2 + \ldots + PA_n \cdot xHA_n / WA_n + PC_1 \cdot XHC_1 / WC_1 + PC_2 \cdot xHC_2 / WC_2 + \ldots + PC_m \cdot xHC_m / WC_m + \text{constant power consumption.}$$

39. The apparatus for calculating an approximate power consumption of an integrated circuit of claim 25, wherein when n-units of vectors A, are inputted to one of the detected function blocks and m-units of vectors $C_j$ are outputted from the one detected function block, said power consumption calculating means calculates the power consumption of the one detected function block, denoted by P, by use of an approximate expression represented by a predetermined function, denoted by f, determined on the basis of any selected numbers of the respective vectors $A_1$ and $C_j$, and a constant power consumption as follows:

$$P = f(PA_i, HA_i, WA_i, \ldots, PC_j, HC_j, WC_j, \ldots) + \text{constant power consumption}$$

where n and m denote integers of one or more, respectively; i and j denote an integer from one to n and m, respectively; $PA_i$ denotes a respective maximum power consumption caused by each vector $A_i$; $HA_i$ denotes a respective number of bits having a predetermined logical value in each vector $A_i$; and $WA_i$ denotes a respective bit width of each vector $A_i$; $PC_j$ denotes a respective maximum power consumption caused by each vector $C_j$; $HC_j$ denotes a respective number of bits having a predetermined logical value in each vector $C_j$; and $WC_j$ denotes a respective bit width of each vector $C_j$.

40. The apparatus for calculating an approximate power consumption of an integrated circuit of claim 39, wherein the predetermined function f is expressed as $$P=f=PA_i\, xHA_i\,/WA_i+\ldots+PC_j\, xHC_j\,/WC_j+\ldots+\text{constant power consumption.}$$

41. The apparatus for calculating an approximate power consumption of an integrated circuit of claim 25, wherein when n-units of vectors $A_i$ are inputted to one of the detected function blocks, said power consumption calculating means calculates the power consumption of the one detected function block, denoted by P, by use of an approximate expression represented by a predetermined function, denoted by f, and a constant power consumption as follows:

$$P=f(PA_1, PA_2, \ldots, PA_n, HA_1, HA_2, \ldots, HA_n, WA_1, WA_2, \ldots WA_n)+\text{constant power consumption}$$

where n denotes an integer of one or more; i denotes an integer from one to n; $PA_i$ denotes a respective maximum power consumption caused by each vector $A_i$; $HA_i$ denotes a respective number of bits having logical values which change in a time transition from a preceding time to a current time in each vector $A_i$; and $WA_i$ denotes a respective bit width of each vector $A_i$.

42. The apparatus for calculating an approximate power consumption of an integrated circuit of claim 41, wherein the predetermined function f is expressed as $$P=f=PA_1\, xHA_1\,/WA_1+PA_2\, xHA_2\,/WA_2+\ldots+PA_n\, xHA_n\,/WA_n+\text{constant power consumption.}$$

43. The apparatus for calculating an approximate power consumption of an integrated circuit of claim 25, wherein when n-units of vectors $A_i$ are inputted to one of the detected function blocks, said power consumption calculating means calculates the power consumption of the one detected function block, denoted by P, by use of an approximate expression represented by a predetermined function, denoted by f, determined on the basis of any selected number of the vectors $A_i$, and a constant power consumption as follows:

$$P=f(PA_i, HA_i, WA_i, \ldots)+\text{constant power consumption}$$

where n denotes an integer of one or more; i denotes an integer between one and n; $PA_i$ denotes respective maximum power consumption caused by each vector $A_i$; $HA_i$ denotes a respective number of bits having logical values which change in a time transition from a preceding time to a current time in each vector $A_i$; and $WA_i$ denotes a respective bit width of each vector $A_i$.

44. The apparatus for calculating an approximate power consumption of an integrated circuit of claim 43 wherein the predetermined function f is expressed as $$P=f=PA_i\, xHA_i\,/WA_i+\ldots+\text{constant power consumption.}$$

45. The apparatus for calculating an approximate power consumption of an integrated circuit of claim 25, wherein when n-units of vectors $A_i$ are inputted to one of the detected function blocks and m-units of vectors $C_j$ are outputted from the one detected function block, said power consumption calculating means calculates the power consumption of the one detected function block, denoted by P, by use of an approximate expression represented by a predetermined function, denoted by f, and a constant power consumption as follows:

$$P=f(PA_1,PA_2,\ldots, PA_n, HA_1, HA_2, \ldots, HA_n, WA_1, WA_2, \ldots WA_n, PC_1, PC_2, \ldots PC_m, HC_1, HC_2, \ldots, HC_m, WC_1, WC_2, \ldots, WC_m)+\text{constant power consumption}$$

where n and m denote integers of one or more, respectively; and i and j denote an integer from one to n and m, respectively; $PA_i$ denotes a respective maximum power consumption caused by each vector $A_i$; $HA_i$ denotes a respective number of bits having logical values which chance in a time transition from a preceding time to a current time in each vector $A_i$; and $WA_i$ denotes a respective bit width of each vector $A_i$; and $PC_j$ denotes a respective maximum power consumption caused by each vector $C_j$; $HC_j$ denotes a respective number of bits having logical values which chance in a time transition from a preceding time to a current time in each vector $C_j$; and $WC_j$ denotes a respective bit width of each vector $C_j$.

46. The apparatus for calculating an approximate power consumption of an integrated circuit of claim 45, wherein the predetermined function f is expressed as $$P=f=PA_1\, xHA_1\,/WA_1+PA_2\, xHA_2\,/WA_2+\ldots+PA_n\, xHA_n\,/WA_n+PC_1\, xHC_1\,/WC_1+PC_2\, xHC_2\,/WC_2+\ldots+PC_m\, xHC_m\,/WC_m+\text{constant power consumption.}$$

47. The apparatus for calculating an approximate power consumption of an integrated circuit of claim 25, wherein when n-units of vectors $A_i$ are inputted to one of the detected function blocks and m-units of vectors $C_j$ are outputted from the one detected function block, said power consumption calculating means calculates the power consumption of the one detected function block, denoted by P, by use of an approximate expression represented by a predetermined function, denoted by f, determined on the basis of any selected numbers of the respective vectors $A_i$ and $C_j$, and a constant power consumption as follows:

$$P=f(PA_i, HA_i, WA_i, \ldots, PC_j, HC_j, WC_j, \ldots)+\text{constant power consumption}$$

where n and m denote integers of one or more, respectively; i and j denote an integer from one to n and m, respectively; $PA_i$ denotes a respective maximum power consumption caused by each vector $A_i$; $HA_i$ denotes a respective number of bits having logical values which chance in a time transition from a preceding time to a current time in each vector $A_i$; and $WA_i$ denotes a respective bit width of each vector $A_i$; $PC_j$ denotes a respective maximum power consumption caused by each vector $C_j$; $HC_j$ denotes a respective number of bits having logical values which change in a time transition from a preceding time to a current time in each vector $C_j$; and $WC_j$ denotes a respective bit width of each vector $C_j$.

48. The apparatus for calculating an approximate power consumption of an integrated circuit of claim 47, wherein the predetermined function f is expressed as $$P=f=PA_i\, xHA_i\,/WA_i+\ldots+PC_j\, xHC_j\,/WC_j+\ldots+\text{constant power consumption.}$$

49. The apparatus for calculating an approximate power consumption of an integrated circuit of claim 25, wherein said power consumption calculating means calculates the power consumption, denoted by P, by use of an approximate expression represented by a predetermined function, denoted by f, and a constant power consumption as follows:

$$P=f(PA, HA, WA, PC, HC, WC)+\text{constant power consumption}$$

where all signals inputted to each of the detected function blocks are denoted by vector A; all signals outputted from each of the detected function blocks are denoted by vector C; a maximum power consumption caused by the vector A is denoted by PA; a number of bits having logical values which change in a time transition from a preceding time to a current time in the vector A is denoted by HA; a bit width of the vector A is denoted by WA; a maximum power consumption caused by the vector C is denoted by PC; a number of bits having logical values which chance in a time transition from a preceding time to a current time in the vector C is denoted by HC; and a bit width of the vector C is denoted by WC.

50. The apparatus for calculating an approximate power consumption of an integrated circuit of claim 49, wherein the predetermined function f is expressed as $$P=f=PA \; xHA \; /WA+PC \; xHC \; /WC+\text{constant power consumption}.$$

* * * * *